US012588001B2

(12) United States Patent (10) Patent No.: US 12,588,001 B2
Mu (45) Date of Patent: Mar. 24, 2026

(54) PAGING MONITORING METHOD, PAGING MONITORING APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 328 days.

(21) Appl. No.: 18/290,689

(22) PCT Filed: Jul. 23, 2021

(86) PCT No.: PCT/CN2021/108284

§ 371 (c)(1),
(2) Date: Jan. 19, 2024

(87) PCT Pub. No.: WO2023/000342

PCT Pub. Date: Jan. 26, 2023

(65) Prior Publication Data

US 2024/0276449 A1 Aug. 15, 2024

(51) Int. Cl.
H04W 68/00 (2009.01)
H04W 68/02 (2009.01)
(52) U.S. Cl.
CPC ......... H04W 68/02 (2013.01); H04W 68/005 (2013.01)
(58) Field of Classification Search
CPC ............... H04W 68/02; H04W 68/005; H04W 52/0235; H04W 52/0245; H04W 52/028;
(Continued)

(56) References Cited

U.S. PATENT DOCUMENTS

2016/0128128 A1* 5/2016 Ang ...................... H04W 76/28
370/311

FOREIGN PATENT DOCUMENTS

AU 2002366153 A1 * 6/2003 ........ H04W 52/0216
CN 106332281 A * 1/2017 ............ H04W 68/02

OTHER PUBLICATIONS

Spreadtrum Communications "Ue power saving enhancements for R18" 3GPP TSG RAN Rel-18 workshop, RWS-210064, Jun.-Jul. 2021, 7 pages.
(Continued)

*Primary Examiner* — Tanmay K Shah
(74) *Attorney, Agent, or Firm* — Cozen O'Connor

(57) ABSTRACT

A paging monitoring method, performed by a terminal, includes receiving first and second paging monitoring configuration information, using a first receiver to perform paging monitoring using a first paging monitoring period, and using a second receiver to perform paging monitoring using a second paging monitoring period, and triggering the first receiver to perform paging monitoring within the second paging monitoring period, in cases where, within the second paging monitoring period, a condition for triggering the first receiver to perform paging monitoring is satisfied. The first paging monitoring period is greater than the second paging monitoring period, and power consumption of the first receiver is greater than power consumption of the second receiver. The first and second paging monitoring configuration information is configured to use the first and second receiver to perform paging monitoring using the first and second paging monitoring period, respectively.

20 Claims, 5 Drawing Sheets

(58) Field of Classification Search
CPC ... H04W 68/00; H04W 68/025; H04W 76/28;
H04W 52/0216; H04W 52/0225; Y02D
30/70
USPC ........................................................ 455/458
See application file for complete search history.

(56) References Cited

OTHER PUBLICATIONS

Huawei at al. "Updated feature lead summary of Wake-up signal configurations and procedures in NB-IoT" 3GPP TSG RAN WGI Meeting #93, RI-1807560, May 2018, 19 pages.
European Patent Application No. 21950591.4, Search and Opinion dated Aug. 1, 2024, 12 pages.
Chinese Patent Application No. 202180002170.1, Office Action dated Sep. 30, 2024, 6 pages.
Chinese Patent Application No. 202180002170.1, English translation of Office Action dated Sep. 30, 2024, 6 pages.
PCT/CN2021/108284 International Search Report dated Mar. 29, 2022, 2 pages.

* cited by examiner

S11 receiving first paging monitoring configuration information and second paging monitoring configuration information

S12 using a first receiver to perform paging monitoring using a first paging monitoring period, based on the first paging monitoring configuration information, and using a second receiver to perform paging monitoring using a second paging monitoring period, based on the second paging monitoring configuration information

S13 triggering the first receiver to perform paging monitoring within the second paging monitoring period, in case that it is determined, within the second paging monitoring period, that a condition for triggering the first receiver to perform paging monitoring is satisfied

FIG. 3

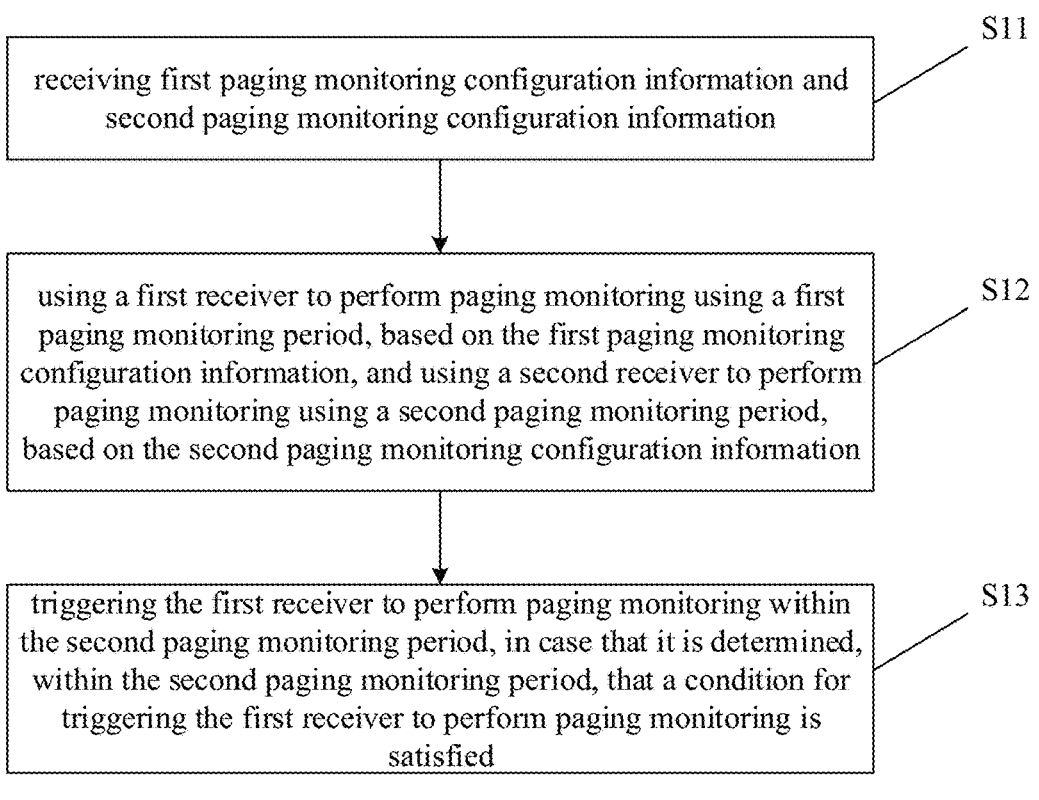

FIG. 4

S21 using the first receiver to monitor a first wake-up message using the first monitoring period

FIG. 5

S31 using the second receiver to monitor a second wake-up message using the second monitoring period

FIG. 6 sending first paging monitoring configuration information and second paging monitoring configuration information

S41

FIG. 7 sending a first wake-up message before sending a paging message, in response to sending the paging message based on the first paging monitoring configuration information

S51

FIG. 8 sending a second wake-up message before sending a paging message, in response to sending the paging message based on the second paging monitoring configuration information

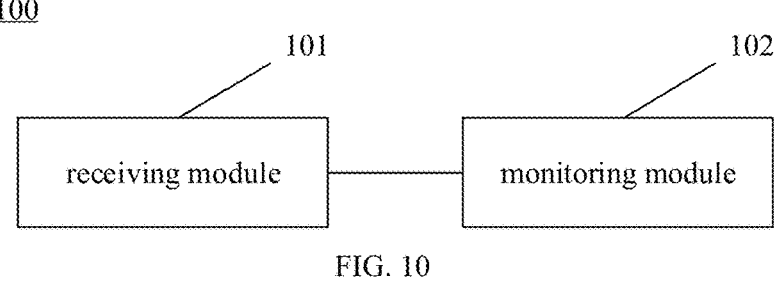

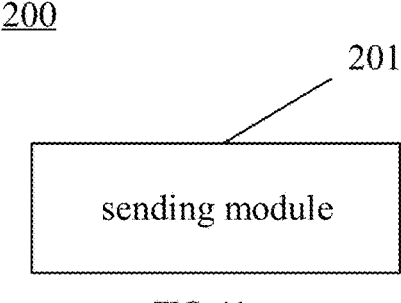

FIG. 11

PAGING MONITORING METHOD, PAGING MONITORING APPARATUS, AND STORAGE MEDIUM

CROSS-REFERENCE TO RELATED APPLICATION

This application is a U.S. national phase application of International Patent Application No. PCT/CN2021/108284, filed on Jul. 23, 2021, the entire contents of which are incorporated herein by reference.

FIELD

The present disclosure relates to the field of wireless communication technologies, and more particularly to a paging monitoring method, a paging monitoring apparatus, and a storage medium.

BACKGROUND

With the development of communication technology, in order to achieve power saving effect, a wake-up indication message is introduced before monitoring a paging message, and a subsequent physical downlink control channel (PDCCH) is determined via a wake-up signal. However, when a terminal detects the PDCCH or a defined wake-up indication message, it is necessary to use a main radio device of the terminal. In a process that the terminal enables the main radio device, more power needs to be consumed, so an almost zero power (AZP) receiver is introduced. When the terminal detects the PDCCH or the wake-up indication message, the AZP receiver is used. In case that the wake-up signal has been detected by the AZP receiver, the main radio device is triggered to be used for reception, otherwise, the terminal continues to sleep to achieve the effect of power saving.

However, coverage of the AZP receiver is limited, requirements for signal reception quality are relatively high, and waveforms of wake-up indication signals supported by the AZP receiver and the main radio device are different. In case that the AZP receiver is configured for the terminal, when the terminal moves, the terminal is likely to move out of the coverage of the AZP receiver, resulting in loss of the paging message.

SUMMARY

According to a first aspect of embodiments of the present disclosure, there is provided a paging monitoring method, which is performed by a terminal. The method includes receiving first paging monitoring configuration information and second paging monitoring configuration information, using a first receiver to perform paging monitoring using a first paging monitoring period, based on the first paging monitoring configuration information, and using a second receiver to perform paging monitoring using a second paging monitoring period, based on the second paging monitoring configuration information, and triggering the first receiver to perform paging monitoring within the second paging monitoring period, in case that it is determined, within the second paging monitoring period, that a condition for triggering the first receiver to perform paging monitoring is satisfied. The first paging monitoring period is greater than the second paging monitoring period, and power consumption of the first receiver is greater than power consumption of the second receiver. The first paging monitoring configuration information is configured to use the first receiver to perform paging monitoring using the first paging monitoring period, and the second paging monitoring configuration information is configured to use the second receiver to perform paging monitoring using the second paging monitoring period.

According to a second aspect of embodiments of the present disclosure, there is provided a paging monitoring method, which is performed by a network device. The method includes sending first paging monitoring configuration information and second paging monitoring configuration information, in which the first paging monitoring configuration information is configured to use a first receiver to perform paging monitoring using a first paging monitoring period, and the second paging monitoring configuration information is configured to use a second receiver to perform paging monitoring using a second paging monitoring period, and triggering the first receiver to perform paging monitoring within the second paging monitoring period, in case that a terminal determines, within the second paging monitoring period, that a condition for triggering the first receiver to perform paging monitoring is satisfied. The first paging monitoring period is greater than the second paging monitoring period, and power consumption of the first receiver is greater than power consumption of the second receiver.

According to a third aspect of embodiments of the present disclosure, there is provided a paging monitoring device. The paging monitoring device includes a processor, and a memory for storing instructions executable by the processor. The processor is configured to execute the paging monitoring method described in the first aspect or any one of implementations of the first aspect, or the paging monitoring method described in the second aspect or any one of implementations of the second aspect.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 3 is a flow chart showing a paging monitoring method performed by a terminal according to an illustrative embodiment.

FIG. 4 is a schematic diagram showing a paging monitoring method according to an illustrative embodiment.

FIG. 5 is a flow chart showing another paging monitoring method performed by a terminal according to an illustrative embodiment.

FIG. 6 is a flow chart showing another paging monitoring method performed by a terminal according to an illustrative embodiment.

FIG. 7 is a flow chart showing another paging monitoring method performed by a network device according to an illustrative embodiment.

FIG. 8 is a flow chart showing another paging monitoring method performed by a network device according to an illustrative embodiment.

FIG. 9 is a flow chart showing another paging monitoring method performed by a network device according to an illustrative embodiment.

FIG. 10 is a block diagram showing a paging monitoring apparatus according to an illustrative embodiment.

FIG. 11 is a block diagram showing another paging monitoring apparatus according to an illustrative embodiment.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Figure 1:
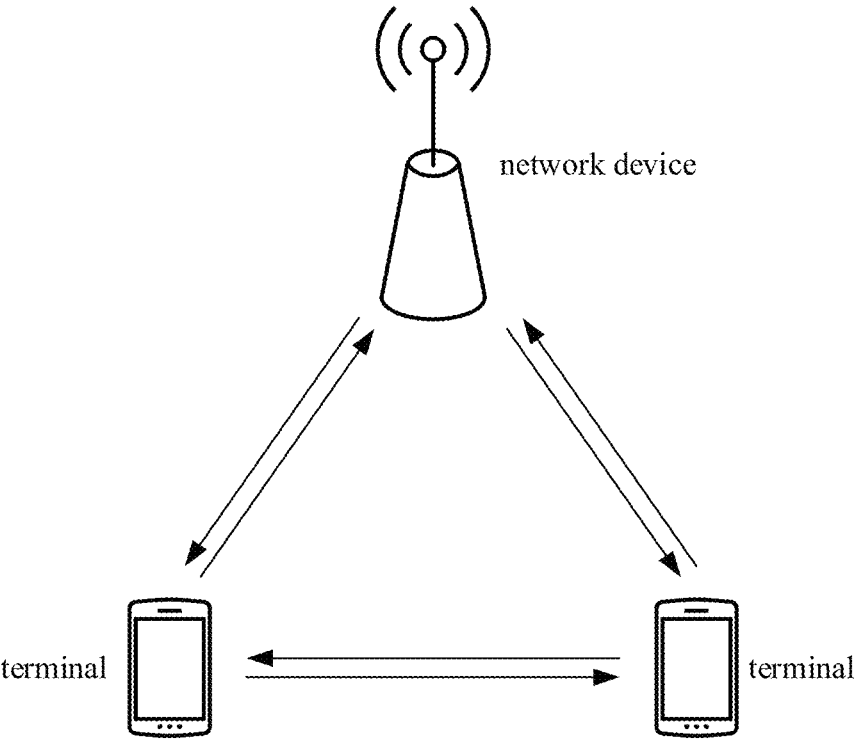
FIG. 1 is a schematic diagram showing a communication system of a network device and a terminal according to an illustrative embodiment.

FIG. 1 is a schematic diagram showing a communication system of a network device and a terminal according to an illustrative embodiment. A communication method provided in the present disclosure may be applied to an architecture diagram of the communication system shown in FIG. 1. As shown in FIG. 1, a network side device may send a signaling based on the architecture shown in FIG. 1.

It may be understood that the communication system of the network device and the terminal shown in FIG. 1 is only for schematic illustration. A wireless communication system may also include other network devices, such as a core network device, a wireless relay device, and a wireless backhaul device, which are not shown in FIG. 1. An embodiment of the present disclosure does not limit the number of network devices and terminals included in the wireless communication system.

It may be further understood that the wireless communication system according to the embodiment of the present disclosure is a network that provides a wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), carrier sense multiple access with collision avoidance. According to the capacity, speed, latency and other factors of different networks, the network may be divided into a 2nd generation (2G) network, a 3G network, a 4G network or a future evolution network, such as a 5G network, the 5G network may also be referred to as a new radio (NR). For convenience of description, the wireless communication network is sometimes referred to as a network in the present disclosure.

Further, the network device involved in the present disclosure may also be referred to as a wireless access network device. The wireless access network device may be a base station, an evolved node B, a home base station, an access point (AP) in a wireless fidelity (WIFI) system, a wireless relay A node, a wireless backhaul node, a transmission point (TP), a transmission and reception point (TRP), etc., and it may also be a gNB in an NR system, or it may also be a component or part of device that constitutes a base station. When it is a vehicle to everything (V2X) communication system, the network device may also be an in-vehicle device. It is to be understood that in the embodiment of the present disclosure, a specific technology and a specific device form adopted by the network device are not limited.

Further, the terminal involved in the present disclosure may also be referred to as a terminal device, a user equipment (UE), a mobile station (MS), a mobile terminal (MT), etc. It is a device that provides voice and/or data connectivity to a user. For example, the terminal may be a handheld device with a wireless connection function, an in-vehicle device, etc. At present, some examples of terminals are a mobile phone, a pocket personal computer (PPC), a palmtop computer, a personal digital assistant (PDA), a notebook computer, a tablet computer, a wearable device, or an in-vehicle device. In addition, when it is a vehicle to everything (V2X) communication system, the terminal device may also be an in-vehicle device. It is to be understood that a specific technology and a specific device adopted by the terminal are not limited in the embodiment of the present disclosure.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

In the communication system, in case that the terminal is in a disconnected state, it is necessary to wake up the terminal periodically to monitor a PDCCH for paging. In case that the PDCCH has been monitored, it is necessary to monitor a subsequent physical downlink shared channel (PDSCH), determine information in the PDSCH, and determine whether it is necessary to access the network or update system information. In case that the PDCCH has not been monitored by the terminal, the terminal continues to sleep to achieve the purpose of power saving.

In a subsequent conference discussion, i.e., in a discussion of release 16, in order to reduce power consumption of the terminal when detecting a paging message, wake-up information (also referred to as wake-up indication information) is introduced. That is, before the terminal blindly checks the PDCCH for paging, the terminal needs to monitor the wake-up information. In case that the wake-up information has been monitored, it is determined that a PDCCH for paging subsequently exists, and the terminal continues to monitor the PDCCH for paging. In case that the wake-up information has not been monitored by the terminal, the monitoring of the PDCCH for paging is skipped.

Figure 2:
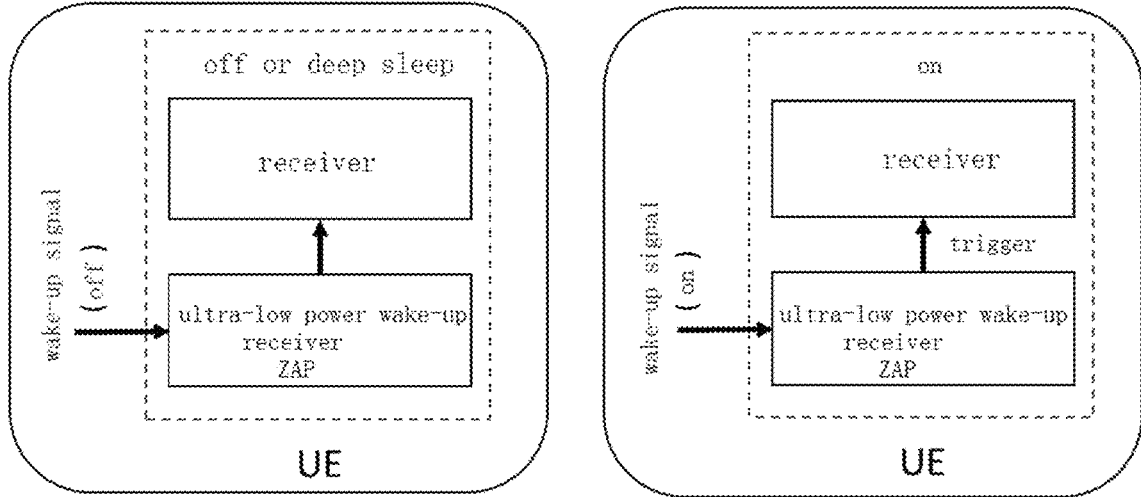
FIG. 2 is a schematic diagram showing using a main radio device based on AZP according to an illustrative embodiment.

In a process of monitoring the PDCCH or the wake-up information, the terminal needs to use a main radio device, and a process of using the main radio device is also relatively power-consuming. Therefore, an AZP receiver is introduced, that is, the AZP receiver is added to the terminal. FIG. 2 is a schematic diagram showing using a main radio device based on AZP according to an illustrative embodiment. As shown in FIG. 2, when the terminal detects the PDCCH or the wake-up indication message, the AZP receiver is used. In case that the wake-up signal is detected by the AZP receiver, the receiver is triggered to be used for reception. The receiver may be a main radio device. At this time, the receiver (main radio device) is turned on, otherwise the terminal turns off the receiver, or makes it continue to sleep to achieve the effect of power saving.

However, coverage of the AZP receiver is relatively limited, and coverage of a normal paging message is larger than the coverage of the AZP receiver. In related technologies, for example, the coverage of the normal paging message may exceed 500 m, while the coverage of the AZP receiver is 100 m. Therefore, when the terminal is configured with the AZP receiver, if the terminal moves, the coverage of the AZP receiver is exceeded. On the other hand, waveforms of wake-up information supported by the AZP receiver and the main radio device are different, and the AZP receiver has higher requirements on a quality of signal reception. These problems may cause loss of the paging message.

Based on this, the present disclosure provides a paging monitoring method. By configuring two sets of paging monitoring configuration information for the terminal, the terminal may use the main radio device and the AZP receiver simultaneously to perform paging monitoring, thus avoiding loss of the paging message due to small coverage of the AZP receiver.

FIG. 3 is a flow chart showing a paging monitoring method according to an illustrative embodiment. As shown in FIG. 3, the paging monitoring method is performed by a terminal. The method includes steps as follows.

In step S11, first paging monitoring configuration information and second paging monitoring configuration information are received.

In step S12, a first receiver is used to perform paging monitoring using a first paging monitoring period, based on the first paging monitoring configuration information, and a second receiver is used to perform paging monitoring using a second paging monitoring period, based on the second paging monitoring configuration information.

In step S13, the first receiver is triggered to perform paging monitoring within the second paging monitoring period, in case that it is determined, within the second paging monitoring period, that a condition for triggering the first receiver to perform paging monitoring is satisfied.

The first paging monitoring period is greater than the second paging monitoring period, and power consumption of the first receiver is greater than power consumption of the second receiver.

In an embodiment of the present disclosure, the terminal may receive the first paging monitoring configuration information and the second paging monitoring configuration information configured for it by a network device. That is, the terminal may configure two sets of paging monitoring configuration information simultaneously, and perform paging monitoring based on configured two sets of paging monitoring configuration information.

The terminal may use the first receiver to perform paging monitoring using the first paging monitoring period, based on the first paging monitoring configuration information. The first receiver may be a main radio device. In case that a PDCCH for paging or a first wake-up signal corresponding to the first receiver has been monitored, a subsequent PDCCH is continuously monitored. In case that a PDCCH for paging or a first wake-up signal corresponding to the first receiver has not been monitored, the terminal goes to sleep, reuses in a next period, and performs paging monitoring using the first paging monitoring period.

The terminal may also use the second receiver to perform paging monitoring using the second paging monitoring period, based on the second paging monitoring configuration information. In case that the terminal determines, within the second paging monitoring period, that the condition for triggering the first receiver to perform paging monitoring is satisfied, the first receiver is triggered. The first receiver is used, and performs paging monitoring. The second receiver may be an AZP receiver with low power consumption.

In the present disclosure, the first paging monitoring period is greater than the second paging monitoring period. That is, the terminal may use different receivers to perform paging monitoring within different periods without overlapping.

In the paging monitoring method provided in the embodiment of the present disclosure, two different sets of paging monitoring configuration information are configured for the terminal, so that the terminal may use different receivers to perform paging monitoring within different periods. The paging monitoring period of the second receiver with low power consumption is relatively short, and the paging monitoring period of the first receiver is relatively long. Thus, loss of the paging message may be avoided while reducing power.

In some embodiments of the present disclosure, the second paging monitoring period is the same as a transmission period of a paging message. For example, a network device configures a discontinuous reception (DRX) period for the terminal, that is, a potential sending occasion of the paging message. The second paging monitoring period configured by the network device may be the same as the DRX period. In other words, a potential sending occasion of a second wake-up signal corresponding to the second receiver is before a potential sending occasion of each paging message. The terminal monitors the second wake-up signal using the second paging monitoring period before a potential sending occasion of each paging message.

In some embodiments of the present disclosure, the first paging monitoring period includes a plurality of transmission periods of a paging message. For example, the terminal perform paging monitoring using the first paging monitoring period, and may perform paging monitoring once based on the plurality of transmission periods of the paging message. Illustratively, the paging monitoring may be performed once in N transmission periods of potentially sending paging messages, where N is greater than 1.

In the embodiment of the present disclosure, when the terminal uses the first receiver to perform paging monitoring using the first paging monitoring period and uses the second receiver to perform paging monitoring using the second paging monitoring period, the first paging monitoring period and its first paging monitoring occasion, the second paging monitoring period and its second paging monitoring occasion, and a sending occasion of the paging message may refer to FIG. 4. FIG. 4 is a schematic diagram showing a paging monitoring method according to an illustrative embodiment. As shown in FIG. 4, FIG. 4 includes the sending occasion of the paging message, the first paging monitoring period detected based on the first receiver (e.g. main radio device) and the second paging monitoring period detected based on the second receiver (e.g. AZP receiver). The first paging monitoring period detected based on the main radio device is longer than the second paging monitoring period detected based on the AZP receiver. A monitoring occasion of the first paging monitoring period may coincide with sending occasions of some paging messages. The monitoring occasion of the second paging monitoring period is before the sending occasion of each paging message.

In some embodiments of the present disclosure, as shown in FIG. 5, the terminal may monitor a first wake-up message based on a manner in FIG. 5, in response to using the first receiver to perform paging monitoring using the first monitoring period. FIG. 5 is a flow chart showing a paging monitoring method according to an illustrative embodiment. The method is performed by a terminal, and includes a step as follows.

In step S21, the first receiver is used to monitor a first wake-up message using the first monitoring period.

In the embodiment of the present disclosure, based on received paging monitoring configuration information, the terminal determines that the first receiver monitors the first wake-up message using the first monitoring period, or determines that the first receiver monitors the PDCCH for paging using the first monitoring period.

In case that the first wake-up message or the PDCCH for paging has been monitored by the terminal using the first paging monitoring period, a subsequent PDCCH is continuously monitored. In case that the first wake-up message or the PDCCH for paging has not been monitored using the first paging monitoring period, the terminal goes to sleep, waits for a next paging monitoring period, and perform paging monitoring at a next paging monitoring occasion.

In some embodiments of the present disclosure, as shown in FIG. 6, the terminal may monitor a second wake-up message based on a manner in FIG. 6, in response to using the second receiver to perform paging monitoring using the second monitoring period. FIG. 6 is a flow chart showing a paging monitoring method according to an illustrative embodiment. The method is performed by a terminal, and includes a step as follows.

In step S31, the second receiver is used to monitor a second wake-up message using the second monitoring period.

In an embodiment of the present disclosure, the terminal determines that the second receiver monitors the second wake-up message using the second monitoring period, based on received paging monitoring configuration information. In case that the second wake-up message has been monitored using the second paging monitoring period, it is determined, within the second paging monitoring period, that the condition for triggering the first receiver to perform paging monitoring is satisfied, and the first receiver is triggered to perform paging monitoring within the second paging monitoring period. In case that the second wake-up message has not been monitored by the second receiver using the second paging monitoring period, the terminal continues to monitor the second wake-up message in a next paging monitoring period.

In some embodiments of the present disclosure, the first wake-up message is determined based on a physical downlink control channel (PDCCH), a Zadoff-Chu (ZC) sequence, or a maximum length linear shift register (m) sequence. The second wake-up signal is determined based on a binary on-off keying (OOK) sequence.

Based on the same concept, an embodiment of the present disclosure also provides a paging monitoring method.

FIG. 7 is a flow chart showing a paging monitoring method according to an illustrative embodiment. As shown in FIG. 7, the paging monitoring method is performed by a network device. The method includes a step as follows.

In step S41, first paging monitoring configuration information and second paging monitoring configuration information are sent.

The first paging monitoring configuration information is configured to use a first receiver to perform paging monitoring using a first paging monitoring period, and the second paging monitoring configuration information is configured to use a second receiver to perform paging monitoring using a second paging monitoring period.

The first receiver is triggered to perform paging monitoring within the second paging monitoring period, in case that a terminal determines, within the second paging monitoring period, that a condition for triggering the first receiver to perform paging monitoring is satisfied.

The first paging monitoring period is greater than the second paging monitoring period, and power consumption of the first receiver is greater than power consumption of the second receiver.

In an embodiment of the present disclosure, the network device configures the first paging monitoring configuration information and the second paging monitoring configuration information for a terminal. That is, the terminal may configure two sets of paging monitoring configuration information simultaneously, and perform paging monitoring based on configured two sets of paging monitoring configuration information.

The terminal may use the first receiver to perform paging monitoring using the first paging monitoring period, based on the first paging monitoring configuration information. The first receiver may be a main radio device. In case that a PDCCH for paging or a first wake-up signal corresponding to the first receiver has been monitored, a subsequent PDCCH is continuously monitored. In case that a PDCCH for paging or a first wake-up signal corresponding to the first receiver has not been monitored, the terminal goes to sleep, reuses in a next period, and performs paging monitoring using the first paging monitoring period.

The terminal may also use the second receiver to perform paging monitoring using the second paging monitoring period, based on the second paging monitoring configuration information. In case that the terminal determines, within the second paging monitoring period, that the condition for triggering the first receiver to perform paging monitoring is satisfied, the first receiver is triggered. The first receiver is used, and performs paging monitoring. The second receiver may be an AZP receiver with low power consumption.

In the present disclosure, the first paging monitoring period is greater than the second paging monitoring period. That is, the terminal may use different receivers to perform paging monitoring within different periods without overlapping.

In the paging monitoring method provided in the embodiment of the present disclosure, two different sets of paging monitoring configuration information are configured for the terminal, so that the terminal may use different receivers to perform paging monitoring within different periods. The paging monitoring period of the second receiver with low power consumption is relatively short, and the paging monitoring period of the first receiver is relatively long. Thus, loss of the paging message may be avoided while reducing power.

In some embodiments of the present disclosure, the second paging monitoring period is the same as a transmission period of a paging message. For example, a network device configures a discontinuous reception (DRX) period for the terminal, that is, a potential sending occasion of the paging message. The second paging monitoring period configured by the network device may be the same as the DRX period. In other words, a potential sending occasion of a second wake-up signal corresponding to the second receiver is before a potential sending occasion of each paging message. The terminal monitors the second wake-up signal using the second paging monitoring period before a potential sending occasion of each paging message.

In some embodiments of the present disclosure, the first paging monitoring period includes a plurality of transmission periods of a paging message. For example, the terminal perform paging monitoring using the first paging monitoring period, and may perform paging monitoring once based on the plurality of transmission periods of the paging message. Illustratively, the paging monitoring may be performed once in N transmission periods of potentially sending paging messages, where N is greater than 1.

In some embodiments of the present disclosure, the network device may configure a paging occasion for the terminal. The paging occasion is a potential sending occasion of a paging message. The paging message sent by the network device is sent periodically, so the paging occasion configured by the network device for the terminal is also periodic. Before the network device sends the paging message based on a period of a configured paging occasion (i.e., the sending occasion of the paging message), it is necessary to determine a type of a receiver that the terminal monitors the paging occasion (or may also determine a used paging monitoring period used), and further determine a type of sending the wake-up message. In case that it is determined that the terminal enables the first receiver to perform paging monitoring using the first monitoring period, as shown in FIG. 8, a first wake-up message may be sent based on a manner in FIG. 8. FIG. 8 is a flow chart showing a paging monitoring method according to an illustrative embodiment. As shown in FIG. 8, the paging monitoring method is performed by a network device and includes a step as follows.

In step S51, a first wake-up message is sent before sending a paging message, in response to sending the paging message based on the first paging monitoring configuration information.

In an embodiment of the present disclosure, the network device has a paging message to be sent at a paging occasion, and it is necessary to determine that configuration information of the paging occasion corresponds to the first paging monitoring period, or that configuration information of the paging occasion corresponds to the second paging monitoring period.

In case that the paging message is sent based on the first paging monitoring configuration information, and a wake-up message is configured, it is determined that the first wake-up message is sent before sending the paging message. In case that no wake-up message is configured, the PDCCH for paging is sent directly.

In an embodiment of the present disclosure, based on received paging monitoring configuration information, the terminal determines that the first receiver monitors the first wake-up message using the first monitoring period, or determines that the first receiver monitors the PDCCH for paging using the first monitoring period.

In case that the first wake-up message or the PDCCH for paging has been monitored by the terminal using the first paging monitoring period, a subsequent PDCCH is continuously monitored. In case that the first wake-up message or the PDCCH for paging has not been monitored using the first paging monitoring period, the terminal goes to sleep, waits for a next paging monitoring period, and performs paging monitoring at a next paging monitoring occasion.

In some embodiments of the present disclosure, the network device may configure the paging occasion for the terminal. The paging occasion is a potential sending occasion of the paging message. The paging message sent by the network device is sent periodically, so the paging occasion configured by the network device for the terminal is also periodic. Before the network device sends the paging message based on a period of a configured paging occasion (i.e., the sending occasion of the paging message), it is necessary to determine a type of a receiver that the terminal monitors the paging occasion (or may also determine a used paging monitoring period), and further determine the type of sending the wake-up message. In case that it is determined that the terminal enables the second receiver to perform paging monitoring using the second monitoring period, as shown in FIG. 9, a second wake-up message may be sent based on a manner in FIG. 9. FIG. 9 is a flow chart showing a paging monitoring method according to an illustrative embodiment. As shown in FIG. 9, the paging monitoring method is performed by a network device and includes a step as follows.

In step S61, a second wake-up message is sent before sending a paging message, in response to sending the paging message based on the second paging monitoring configuration information.

In an embodiment of the present disclosure, the network device has a paging message to be sent at a paging occasion, and it is necessary to determine that configuration information of the paging occasion corresponds to the first paging monitoring period, or that configuration information of the paging occasion corresponds to the second paging monitoring period.

In case that the paging message is sent based on the second paging monitoring configuration information, it is determined that the second wake-up message is sent before the paging message is sent.

In the embodiment of the present disclosure, the terminal determines that the second receiver monitors the second wake-up message using the second monitoring period based on received paging monitoring configuration information. In case that the second wake-up message has been monitored using the second paging monitoring period, it is determined, within the second paging monitoring period, that the condition for triggering the first receiver to perform paging monitoring is satisfied, and the first receiver is triggered to perform paging monitoring within the second paging monitoring period. In case that the second wake-up message has not been monitored by the second receiver using the second paging monitoring period, the terminal continues to monitor the second wake-up message in a next paging monitoring period.

In some embodiments of the present disclosure, the first wake-up message is determined based on a physical downlink control channel (PDCCH), a Zadoff-Chu (ZC) sequence, or a maximum length linear shift register (m) sequence. The second wake-up signal is determined based on a binary on-off keying (OOK) sequence.

Based on the same concept, an embodiment of the present disclosure also provides a paging monitoring apparatus.

It may be understood that, in order to realize the above-mentioned functions, the paging monitoring apparatus provided in the embodiment of the present disclosure includes corresponding hardware structures and/or software modules for executing various functions. Combining with units and algorithm steps of various examples disclosed in the embodiments of the present disclosure, the embodiments of the present disclosure may be implemented in the form of hardware or a combination of hardware and computer software. Whether a function is executed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

FIG. 10 is a block diagram showing a paging monitoring apparatus according to an illustrative embodiment. Referring to FIG. 10, the paging monitoring apparatus 100, applied to a terminal, includes a receiving module 101 and a monitoring module 102.

The receiving module 101 is configured to receive first paging monitoring configuration information and second paging monitoring configuration information. The monitoring module 102 is configured to use a first receiver to perform paging monitoring using a first paging monitoring period, based on the first paging monitoring configuration information, and use a second receiver to perform paging monitoring using a second paging monitoring period, based on the second paging monitoring configuration information. The first receiver is triggered to perform paging monitoring within the second paging monitoring period, in case that it is determined, within the second paging monitoring period, that a condition for triggering the first receiver to perform paging monitoring is satisfied. The first paging monitoring period is greater than the second paging monitoring period, and power consumption of the first receiver is greater than power consumption of the second receiver.

In an embodiment of the present disclosure, the second paging monitoring period is the same as a transmission period of a paging message.

In an embodiment of the present disclosure, the first paging monitoring period includes a plurality of transmission periods of a paging message.

In an embodiment of the present disclosure, the monitoring module 102 is configured to use the first receiver to monitor a first wake-up message using the first monitoring period.

The monitoring module 102 is configured to use the second receiver to monitor a second wake-up message using the second monitoring period. The condition for triggering the first receiver to perform paging monitoring includes the second wake-up message has been monitored by the second receiver using the second monitoring period.

In an embodiment of the present disclosure, the first wake-up message is determined based on a physical downlink control channel (PDCCH), a Zadoff-Chu (ZC) sequence, or a maximum length linear shift register (m) sequence. The second wake-up signal is determined based on a binary on-off keying (OOK) sequence.

FIG. 11 is a block diagram showing a paging monitoring apparatus according to an illustrative embodiment. Referring to FIG. 11, the paging monitoring apparatus 200, applied to network device, includes a sending module 201.

The sending module 201 is configured to send first paging monitoring configuration information and second paging monitoring configuration information.

The first paging monitoring configuration information is configured to use a first receiver to perform paging monitoring using a first paging monitoring period, and the second paging monitoring configuration information is configured to use a second receiver to perform paging monitoring using a second paging monitoring period. The first receiver is triggered to perform paging monitoring within the second paging monitoring period, in case that a terminal determines, within the second paging monitoring period, that a condition for triggering the first receiver to perform paging monitoring is satisfied.

The first paging monitoring period is greater than the second paging monitoring period, and power consumption of the first receiver is greater than power consumption of the second receiver.

In an embodiment of the present disclosure, the second paging monitoring period is the same as a transmission period of a paging message.

In an embodiment of the present disclosure, the first paging monitoring period includes a plurality of transmission periods of a paging message.

In an embodiment of the present disclosure, the sending module 201 is further configured to send a first wake-up message before sending a paging message, in response to sending the paging message based on the first paging monitoring configuration information, or send a second wake-up message before sending a paging message, in response to sending the paging message based on the second paging monitoring configuration information.

In an embodiment of the present disclosure, the first wake-up message is determined based on a physical downlink control channel (PDCCH), a Zadoff-Chu (ZC) sequence, or a maximum length linear shift register (m) sequence. The second wake-up signal is determined based on a binary on-off keying (OOK) sequence.

Regarding the apparatus in the above-mentioned embodiment, the specific manner in which each module performs operations has been described in detail in the embodiment of the method, which will not be elaborated herein.

Two sets of paging monitoring configuration information configured for the terminal to perform paging monitoring are determined, and the paging monitoring may be performed in different paging monitoring periods based on the two sets of paging monitoring configuration information. That is, the terminal may use different receivers to perform paging monitoring within different periods, the paging monitoring period of the second receiver with low power consumption is relatively short, and the paging monitoring period of the first receiver is relatively long, so that loss of the paging message may be avoided while reducing power.

Figure 12:
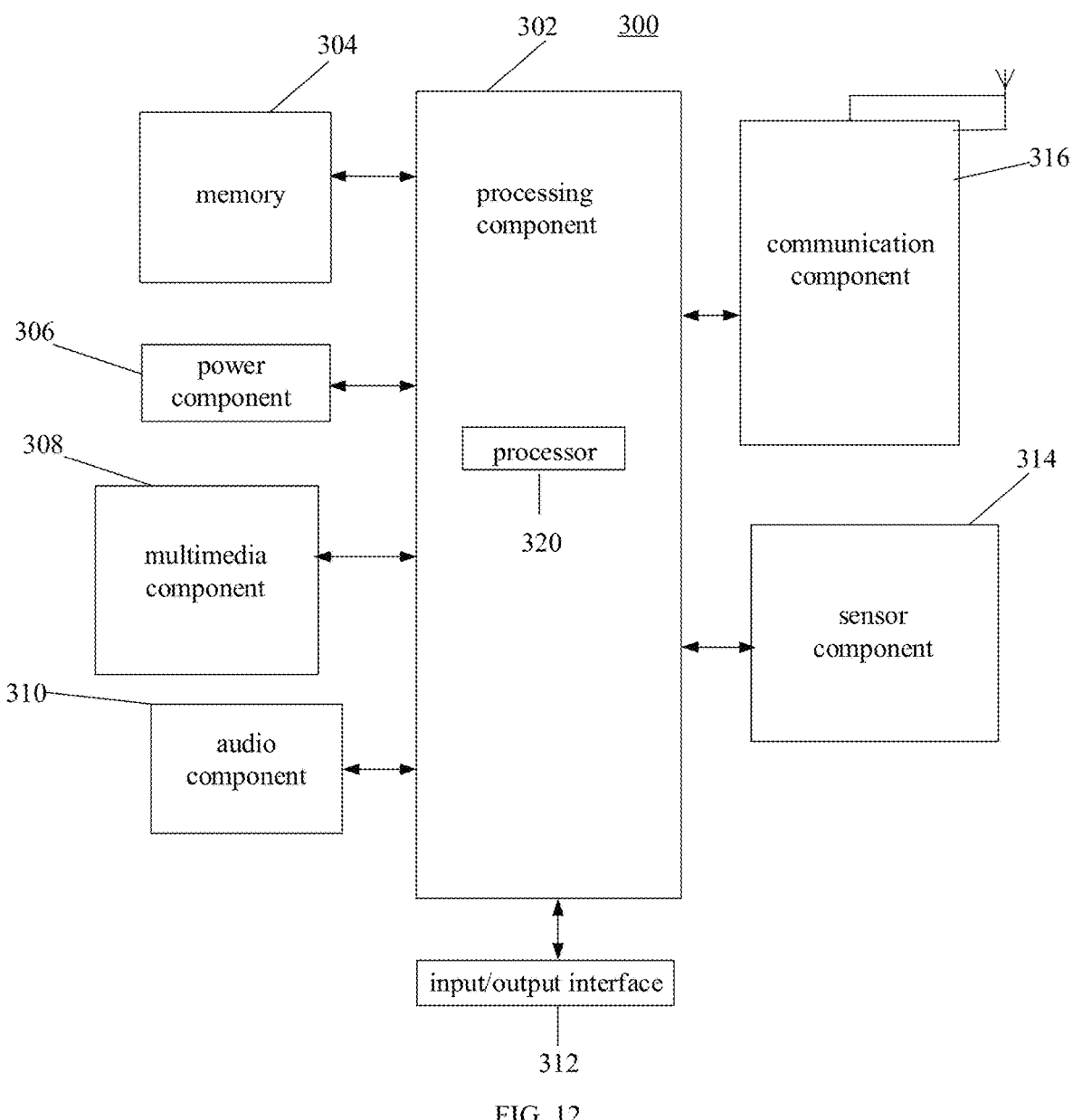
FIG. 12 is a block diagram showing a device for paging monitoring according to an illustrative embodiment.

FIG. 12 is a block diagram showing a device 300 for paging monitoring according to an illustrative embodiment. For example, the device 300 can be a mobile phone, a computer, a digital broadcast terminal, a messaging device, a game console, a tablet device, a medical device, a fitness device, a personal digital assistant, or the like.

Referring to FIG. 12, the device 300 may include one or more of the following components a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, phone calls, data communications, camera operations, and recording operations. The processing component 302 can include one or more of processors 320 to execute instructions to perform all or some of the steps in the above-described methods. Moreover, the processing component 302 may include one or more of modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, videos, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more of power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more of touch sensors to sense touches, swipes, and gestures on the touch panel. The touch sensors may not only sense a boundary of a touch or swipe action, but also sense a duration and a pressure associated with the touch or swipe action. In some embodiments, the multimedia component 308 includes a front camera and/or a rear camera. The front camera and/or the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as keyboards, click wheels, buttons, and the like. The buttons may include, but are not limited to, a home button, a volume button, a starting button, and a locking button.

The sensor component 314 includes one or more of sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may further include a light sensor, such as a CMOS or CCD image sensor, for use in imaging applications. In some embodiments, the sensor component 314 may further include an accelerometer sensor, a gyroscope sensor, a magnetic sensor, a pressure sensor, or a temperature sensor.

The communication component 316 is configured to facilitate communication, wired or wireless, between the device 300 and other devices. The device 300 can access a wireless network based on a communication standard, such as WiFi, 2G, or 3G, or a combination thereof. In an illustrative embodiment, the communication component 316 receives a broadcast signal or broadcast associated information from an external broadcast management system via a broadcast channel. In an illustrative embodiment, the communication component 316 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In an illustrative embodiment, the device 300 may be implemented with one or more of application specific integrated circuits (ASICs), a digital signal processor (DSP), a digital signal processing device (DSPD), a programmable logic device (PLD), a field programmable gate array (FPGA), a controller, a micro-controller, a microprocessor, or other electronic elements, for performing the above-mentioned method.

In an illustrative embodiment, there is also provided a non-transitory computer readable storage medium including instructions, such as included in the memory 304, executable by the processor 320 in the device 300, for completing the above-mentioned method. For example, the non-transitory computer-readable storage medium may be a ROM, a random access memory (RAM), a CD-ROM, a magnetic tape, a floppy disc, an optical data storage device, and the like.

Figure 13:
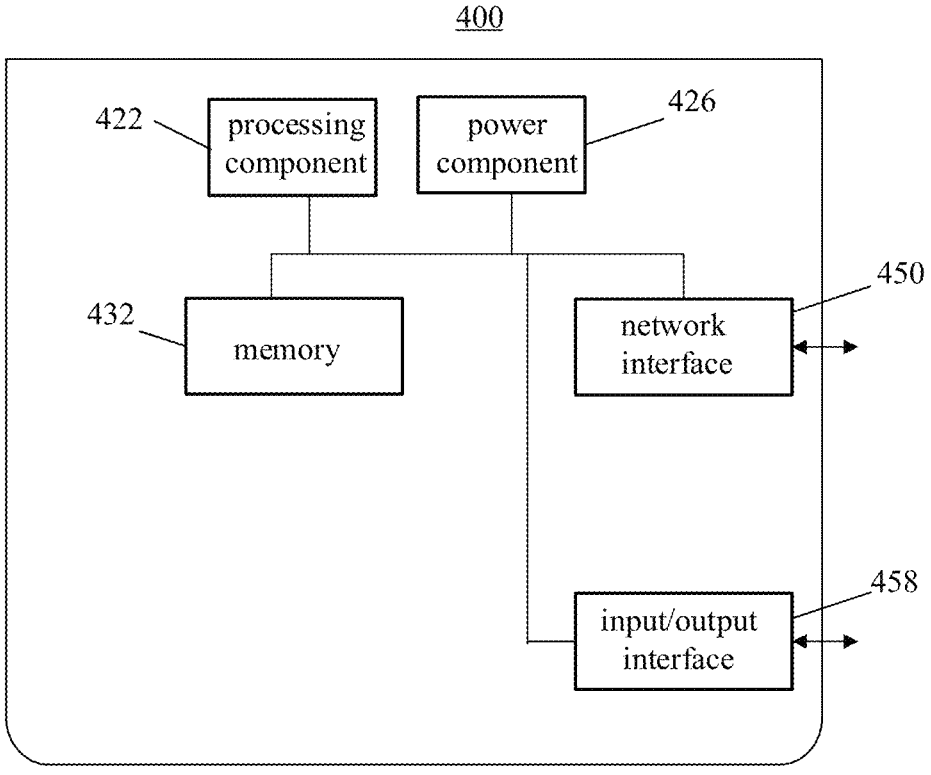
FIG. 13 is a block diagram showing another device for paging monitoring according to an illustrative embodiment.

FIG. 13 is a block diagram showing a device 400 for paging monitoring according to an illustrative embodiment. For example, the device 400 may be provided as a server. Referring to FIG. 12, the device 400 includes a processing component 422, which further includes one or more of processors, and memory resources represented by a memory 432 for storing instructions executable by the processing component 422, such as an application program. The application program stored in the memory 432 may include one or more modules each corresponding to a set of instructions. In addition, the processing component 422 is configured to execute instructions to perform the above-mentioned method.

The device 400 may further include a power component 426 configured to perform power management of the device 400, a wired or wireless network interface 450 configured to connect the device 400 to a network, and an input/output (I/O) interface 458. The device 400 may operate based on an operating system stored in the memory 432, such as Windows Server™, Mac OS X™, Unix™, Linux™, FreeBSD™, or the like.

It is further understood that "a plurality" in the present disclosure refers to two or more, and other quantifiers are similar thereto. "And/or," which describes an associated relationship of associated objects, means that there may be three relationships, for example, A and/or B, which may mean that A exists alone, A and B exist at the same time, and B exists alone. A character "/" generally indicates that contextual objects are in an "or" relationship. "A/an" and "the" in singular forms are intended to include plural forms, unless clearly indicated in the context otherwise.

It is further understood that terms such as "first," and "second" are used to describe various information, these information should not be limited by these terms. These terms are only used for distinguishing information of the same type from each other and do not denote a particular order or degree of importance. As a matter of fact, the terms such as "first," and "second" may be used interchangeably. For example, first information may also be referred to as second information, and similarly, the second information may also be referred to as the first information, without departing from the scope of embodiments of the present disclosure.

It is further understood that although operations are described in a specific order in the accompanying drawings in the embodiments of the present disclosure, it should not be understood that these operations are required to be performed in the specific order shown or in a serial order, or that all of the operations shown are required to be performed to obtain desired results. In certain circumstances, multi-tasking and parallel processing may be advantageous.

Other embodiments of the present disclosure will be apparent to those skilled in the art from consideration of the specification and practice of the present disclosure disclosed here. The present disclosure is intended to cover any varia-tions, uses, or adaptations of the present disclosure follow-ing the general principles thereof and including such depar-tures from the present disclosure as come within known or customary practice in the art. It is intended that the speci-fication and examples be considered as exemplary only, with a true scope and spirit of the present disclosure being indicated by the scope of the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the scope of the appended claims.

What is claimed is:

1. A paging monitoring method, performed by a terminal, comprising:
   receiving first paging monitoring configuration informa-tion and second paging monitoring configuration infor-mation;
   using a first receiver to perform paging monitoring using a first paging monitoring period, based on the first paging monitoring configuration information, and using a second receiver to perform paging monitoring using a second paging monitoring period, based on the second paging monitoring configuration information; and
   triggering the first receiver to perform paging monitoring within the second paging monitoring period, in case that it is determined, within the second paging moni-toring period, that a condition for triggering the first receiver to perform paging monitoring is satisfied;
   wherein the first paging monitoring period is greater than the second paging monitoring period, and power con-sumption of the first receiver is greater than power consumption of the second receiver;
   wherein the first paging monitoring configuration infor-mation is configured to use the first receiver to perform paging monitoring using the first paging monitoring period, and the second paging monitoring configuration information is configured to use the second receiver to perform paging monitoring using the second paging monitoring period.

2. The paging monitoring method of claim 1, wherein the second paging monitoring period is the same as a transmis-sion period of a paging message.

3. The paging monitoring method of claim 1, wherein the first paging monitoring period comprises a plurality of transmission periods of a paging message.

4. The paging monitoring method of claim 1, wherein using the first receiver to perform paging monitoring using the first monitoring period comprises: using the first receiver to monitor a first wake-up signal using the first monitoring period;
   using the second receiver to perform paging monitoring using the second monitoring period comprises: using the second receiver to monitor a second wake-up signal using the second monitoring period; and
   the condition for triggering the first receiver to perform paging monitoring comprises: the second wake-up sig-nal has been monitored by the second receiver using the second monitoring period.

5. The paging monitoring method of claim 4, wherein the first wake-up signal is determined based on a physical downlink control channel (PDCCH), a Zadoff-Chu (ZC) sequence, or a maximum length linear shift register (m) sequence; and
   the second wake-up signal is determined based on a binary on-off keying (OOK) sequence.

6. A paging monitoring method, performed by a network device, comprising:
   sending first paging monitoring configuration information and second paging monitoring configuration informa-tion; wherein the first paging monitoring configuration information is configured to use a first receiver to perform paging monitoring using a first paging moni-toring period, and the second paging monitoring con-figuration information is configured to use a second receiver to perform paging monitoring using a second paging monitoring period; and
   triggering the first receiver to perform paging monitoring within the second paging monitoring period, in case that a terminal determines, within the second paging monitoring period, that a condition for triggering the first receiver to perform paging monitoring is satisfied;
   wherein the first paging monitoring period is greater than the second paging monitoring period, and power con-sumption of the first receiver is greater than power consumption of the second receiver.

7. The paging monitoring method of claim 6, wherein the second paging monitoring period is the same as a transmis-sion period of a paging message.

8. The paging monitoring method of claim 6, wherein the first paging monitoring period comprises a plurality of transmission periods of a paging message.

9. The paging monitoring method of claim 6, further comprising:
   sending a first wake-up signal before sending a paging message, in response to sending the paging message based on the first paging monitoring configuration information; or
   sending a second wake-up signal before sending a paging message, in response to sending the paging message based on the second paging monitoring configuration information.

10. The paging monitoring method of claim 9, wherein the first wake-up signal is determined based on a physical downlink control channel (PDCCH), a Zadoff-Chu (ZC) sequence, or a maximum length linear shift register (m) sequence;

the second wake-up signal is determined based on a binary on-off keying (OOK) sequence.

11. A paging monitoring device, comprising:
a processor; and
a memory for storing instructions executable by the processor;
wherein the processor is configured to execute the paging monitoring method of claim 6.

12. The paging monitoring device of claim 11, wherein the second paging monitoring period is the same as a transmission period of a paging message.

13. The paging monitoring device of claim 11, wherein the first paging monitoring period comprises a plurality of transmission periods of a paging message.

14. The paging monitoring device of claim 11, wherein the processor is configured to:

send a first wake-up signal before sending a paging message, in response to sending the paging message based on the first paging monitoring configuration information; or send a second wake-up signal before sending a paging message, in response to sending the paging message based on the second paging monitoring configuration information.

15. The paging monitoring device of claim 14, wherein the first wake-up signal is determined based on a physical downlink control channel (PDCCH), a Zadoff-Chu (ZC) sequence, or a maximum length linear shift register (m) sequence;

the second wake-up signal is determined based on a binary on-off keying (OOK) sequence.

16. A paging monitoring device, comprising:
a processor; and
a memory for storing instructions executable by the processor;
wherein the processor is configured to:
receive first paging monitoring configuration information and second paging monitoring configuration information;
use a first receiver to perform paging monitoring using a first paging monitoring period, based on the first paging monitoring configuration information, and use a second receiver to perform paging monitoring using a second paging monitoring period, based on the second paging monitoring configuration information; and trigger the first receiver to perform paging monitoring within the second paging monitoring period, in case that it is determined, within the second paging monitoring period, that a condition for triggering the first receiver to perform paging monitoring is satisfied;

wherein the first paging monitoring period is greater than the second paging monitoring period, and power consumption of the first receiver is greater than power consumption of the second receiver;

wherein the first paging monitoring configuration information is configured to use the first receiver to perform paging monitoring using the first paging monitoring period, and the second paging monitoring configuration information is configured to use the second receiver to perform paging monitoring using the second paging monitoring period.

17. The paging monitoring device of claim 16, wherein the second paging monitoring period is the same as a transmission period of a paging message.

18. The paging monitoring device of claim 16, wherein the first paging monitoring period comprises a plurality of transmission periods of a paging message.

19. The paging monitoring device of claim 16, wherein the processor is configured to:

use the first receiver to monitor a first wake-up signal using the first monitoring period; or use the second receiver to monitor a second wake-up signal using the second monitoring period;

wherein the condition for triggering the first receiver to perform paging monitoring comprises: the second wake-up signal has been monitored by the second receiver using the second monitoring period.

20. The paging monitoring device of claim 19, wherein the first wake-up signal is determined based on a physical downlink control channel (PDCCH), a Zadoff-Chu (ZC) sequence, or a maximum length linear shift register (m) sequence; and the second wake-up signal is determined based on a binary on-off keying (OOK) sequence.

* * * * *